United States Patent [19]

Etcheparre et al.

[11] Patent Number: 4,942,284

[45] Date of Patent: Jul. 17, 1990

[54] LASER CUTTING APPARATUS PROVIDED WITH A GAS EVACUATION DEVICE

[75] Inventors: Jean Etcheparre; Bernard Etcheparre, both of Bordeaux, France

[73] Assignee: Lectra Systemes, France

[21] Appl. No.: 314,190

[22] Filed: Feb. 22, 1989

[30] Foreign Application Priority Data

Feb. 24, 1988 [FR] France ................. 88 02256

[51] Int. Cl.⁵ .............................. B23K 26/00
[52] U.S. Cl. .......................... 219/121.67; 219/121.84
[58] Field of Search ...................... 219/121.67, 121.72, 219/121.84, 121.61, 121.85

[56] References Cited

U.S. PATENT DOCUMENTS

| | | | |
|---|---|---|---|
| 3,565,660 | 3/1971 | Houldcroft | 219/121.84 X |
| 3,626,141 | 12/1971 | Daly | 219/121.84 |
| 3,656,230 | 10/1972 | Friedrich | 219/121.84 X |
| 3,866,398 | 2/1975 | Vernon et al. | 219/121.84 |
| 4,031,351 | 6/1977 | Martin | 219/121.84 X |
| 4,550,241 | 10/1985 | Scott et al. | 219/121.67 |
| 4,720,621 | 1/1988 | Langen | 219/121.84 X |

FOREIGN PATENT DOCUMENTS 0187588 8/1987 Japan ........................... 219/121.84
2048785 12/1980 United Kingdom .

*Primary Examiner*—C. L. Albritton
*Attorney, Agent, or Firm*—Curtis, Morris & Safford

[57] ABSTRACT

This invention relates to a laser cutting apparatus comprising a laser radiation emitter, a focussing lens fixed in an adjustable sliding sleeve, said sleeve being extended, towards the material to be cut, by a truncated nozzle of which the small end is in the immediate vicinity of said material to be cut, said apparatus comprising a gas-evacuation device constituted by a hood—called ejector—open towards the material to be cut and fixed on said sliding sleeve. According to the invention, said ejector comprises, on its periphery and on its open face lying opposite the material to be cut, openings allowing the injection of gas-air along convergent axes, and, in its upper part, a pipe for evacuating the gases. The invention is more particularly applicable to the cutting of materials in sheet form.

2 Claims, 1 Drawing Sheet

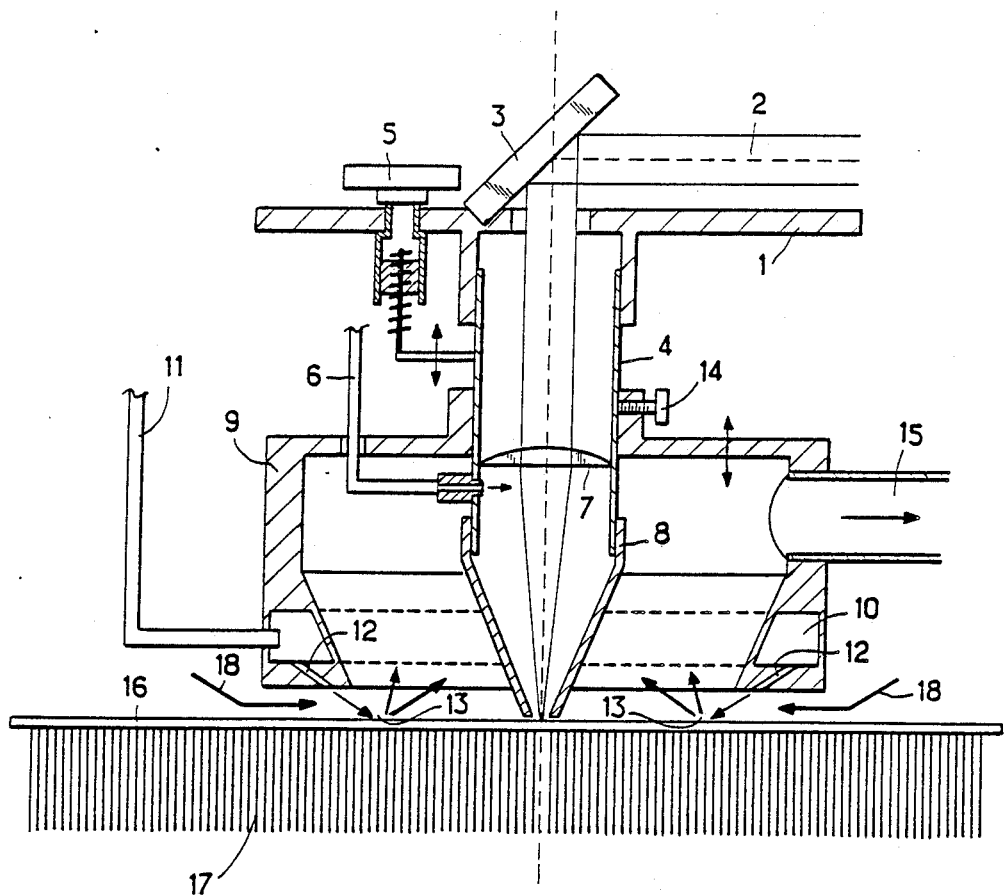

LASER CUTTING APPARATUS PROVIDED WITH A GAS EVACUATION DEVICE

FIELD OF THE INVENTION

The present invention relates to a laser cutting apparatus provided with a gas-evacuating device.

BACKGROUND OF THE INVENTION

It has been known for a long time to use a laser as cutting tool more particularly for materials in sheet form. To that end, a laser source is available, generating a light beam, which is directed by means of mirrors towards the zone of cut. Before it reaches the plane of cut, there is interposed on its path a focussing lens whose role is to concentrate the light beam into a spot of very small diameter, which furnishes a very high density of energy. Very different materials may thus be cut out provided that the thicknesses are not too great.

Cutting is obtained by melting of the material at the spot where the beam is focussed. Such melting, as a function of the nature of the material, may generate gas, of which the drawbacks are multiple: formation of a screen in front of the beam and thus absorption of power, pollution of the environment (odour and possible toxicity), pollution along the line of cut (unaesthetic blackish marks).

In order to limit these drawbacks, suction nozzles are generally employed, consisting of a dish enveloping the beam between the focussing lens and the plane of cut and in which a slight depression is created. Although this process is satisfactory with relative nozzle/material displacements which are not very rapid, this does not apply when it is desired to cut at high speed. This is the case for example for cutting out generally fine fabrics, which may be cut out at up to 100 m/min. At such speeds, the emitted gas does not have the time to be sucked by the nozzle and it remains in contact with the material. One improvement consists in increasing the depression within the nozzle, but in that case, not only the gas but also the material is sucked. What is more serious is that the debris cut out is separated from the cutting support and may burst into flame spontaneously on passing through the defocussed beam, this obviously being seriously damaging.

The invention set forth hereinafter relates to a gas-sucking device, which eliminates all the drawbacks mentioned hereinabove.

The gist of the device according to the invention consists in suitably organizing the circulations of gas (air) at the level of the zone of cut.

The laser cutting apparatus used is known per se; it may be schematically described as comprising a laser radiation emitter, a lens for focussing said radiation, fixed in an adjustable sliding sleeve and a truncated nozzle extending said sleeve towards the material to be cut and of which the small end is located in the immediate vicinity of said material to be cut.

Such an apparatus comprises a device for evacuating the gases which is essentially constituted by a hood (hereinafter referred to as ejector) open towards the material to be cut and fixed on said sliding sleeve, in which hood are arranged the elements ensuring appropriate circulation and evacuation of a gas (air).

SUMMARY OF THE INVENTION

These elements, which are characteristic of the invention, are constituted by an ejector which comprises on its open face lying opposite the material to be cut, openings allowing the injection of gas (air), of which the axes are convergent, and which also comprises in its upper part a pipe for evacuating the gases.

The apparatus according to the invention advantageously further comprises a tube for injection of compressed gas into the space defined by the focussing lens, the sleeve and the truncated nozzle.

BRIEF DESCRIPTION OF THE DRAWINGS

The invention will be more readily understood on reading the following description with reference to the accompanying drawings, in which:

The single FIGURE shows a simplified section of the cutting apparatus and of the gas-evacuation device.

DETAILED DESCRIPTION OF THE DRAWINGS

Referring now to the drawings, the cutting head is fixed on the machine via the support 1. This latter may be fixed, in which case it is the material which moves therebeneath. It may also be part of a mobile carriage moving above the material, the latter in that case remaining fixed.

The laser beam 2 arrives parallel to the plan of cut 17 and is reflected perpendicularly thereto by a mirror 3 inclined by 45 degrees. The beam thus deviated passes through a focussing lens 7 and is focussed just at the level of the material at a distance corresponding to the focal distance of the lens. This lens 7 is fixed in a sleeve 4 adapted to slide with respect to the support 1. Displacement and maintenance in position of the sleeve 4 are adjusted by a screw/nut device 5. The height of the lens with respect to the material 16 resting on the plane of cut 17 may thus be adjusted very precisely and the optimum conditions of cut obtained. The sleeve 4 is extended at its lower end by a truncated nozzle 8 of which the end hole is very close to the focussing point. A compressed gas is injected inside the volume defined by the lower face of the lens, the lower part of the sleeve 4 and the nozzle 8 via a tube 6. The gas is generally compressed air, but it may also be oxygen or a neutral gas or any gas promoting the conditions of cut. The gas injected at that spot has several roles: on the one hand, it cools the lower face of the lens 7, on the other hand it protects the lens against outside pollutions and, finally, it prevents the formation of a flame created by the heating of the emitted gas (constituted by very fine particles of the cut material) passing through the beam. This latter point, apart from eliminating the danger of burning, makes a very clean cut possible. It is advantageous to be able to adjust the position of the nozzle 8 with respect to the sleeve 4 as a function of the variable thicknesses of the materials.

A piece 9, which will hereinafter be referred to as "ejector", is used for evacuating the emitted gases. It is constituted, on the one hand, by a cavity defined by a cylindrical envelope. On the other hand, in its lower part, there is arranged a toric conduit 10 connected to a compressed air pipe 11. On the lower periphery of the torus 10 are pierced several holes 12 whose axes are convergent. The point of convergence of these axes lies on the optical lens axis, below the focussing plane (i.e. of the cut material). The different air streams, created by the passage of the compressed air through these holes, are reflected (13) by the material to be cut, towards the centre of the ejector 9. The centre of the ejector is thus in excess pressure with respect to the outside. A pipe 15 located in the upper part of the ejector 9 allows evacuation of this excess pressure, by creating a considerable circulation of air. The gases generated by the cutting of the material are thus taken along by the air current and evacuated into the pipe 15. The inclination of the streams has another effect of creating a slight depression beneath the lower periphery of the ejector, creating another circulation of air 18 passing from the outside towards the interior of the ejector, passing below the ejector. This can be assimilated to the Venturi effect. A barrier through which the emitted gases cannot pass is created, and said gases cannot issue at that spot.

The ejector 9 will preferably be mounted to slide freely on the sleeve 4 so as to adjust the distance separating the ejector from the material to be cut. A locking screw 14 holds the ejector 9 in position to that end.

The technician will suitably adjust the various elements constituting the gas-evacuation device so as to obtain optimum operation. Those elements influencing operation are as follows: the diameter over which the inclined holes are distributed, the angle of inclination of the holes, the diameter of the holes, the number of holes, the distance between the base of the ejector and the material to be cut, the pressure of the compressed air, and finally the diameter of the evacuation tube. Typical values for correct operation are given hereinafter by way of example:

| | |
|---|---|
| ∅ of boring of the holes | 80 mm |
| angle of inclination of the holes (with respect to the plane of cut) | 30° |
| ∅ of the holes | 2 mm |
| number of holes | 12 |
| distance between ejector and cut material | 10 mm |
| pressure of the compressed air | 4 bars |
| diameter of the evacuation pipe | 30 mm |

The values may be different, but certain must evolve at the same time. For example, if the distance between the ejector and the material is increased, the diameter of boring of the holes and the pressure of the compressed air must be increased. This same ejector/material distance will evolve if the number of holes or their diameter is changed, and so on. For a group of values ensuring correct operation, the variation of just one of these values compromises the result. The only parameter with only a very slight influence on the behaviour is the inner shape of the ejector. This will generally be a cylindrical or cylindrical/truncated cavity. What is important is not to create disturbances in the path of the air and to limit to a maximum the pressure drops. If the evacuation pipe must be extended by a pipe of considerable length, it may be necessary to associate a small aspirator in order to overcome the pressure losses in the extension tube.

Another advantage of the invention resides in its action of application of the cut pieces on the cutting support. For very light materials, suction of the pieces in the ejector is thus avoided.

Finally, a further advantageous aspect is the total absence of odour during cutting of materials such as leather, wool, plastics materials, which materials generally emit an unpleasant smell when they are burnt. These odours are taken along with the emitted gases.

What is claimed is:

1. In a laser cutting apparatus comprising a laser radiation emitter, a focussing lens fixed in an adjustable sliding sleeve, said sleeve being extended, towards the material to be cut, by a truncated nozzle of which the small end is in the immediate vicinity of said material to be cut, said apparatus comprising a gas-evacuation device constituted by a hood—called ejector—open towards the material to be cut and fixed on said sliding sleeve, said ejector comprises, on its periphery and on its open face lying opposite the material to be cut, openings allowing the injection of gas-air along convergent axes, and, in its upper part, a pipe for evacuating the gases.

2. The apparatus of claim 1, wherein it comprises a tube for the admission of compressed gas opening inside the space defined by said focussing lens, sleeve and said nozzle.

* * * * *